Figure 1:
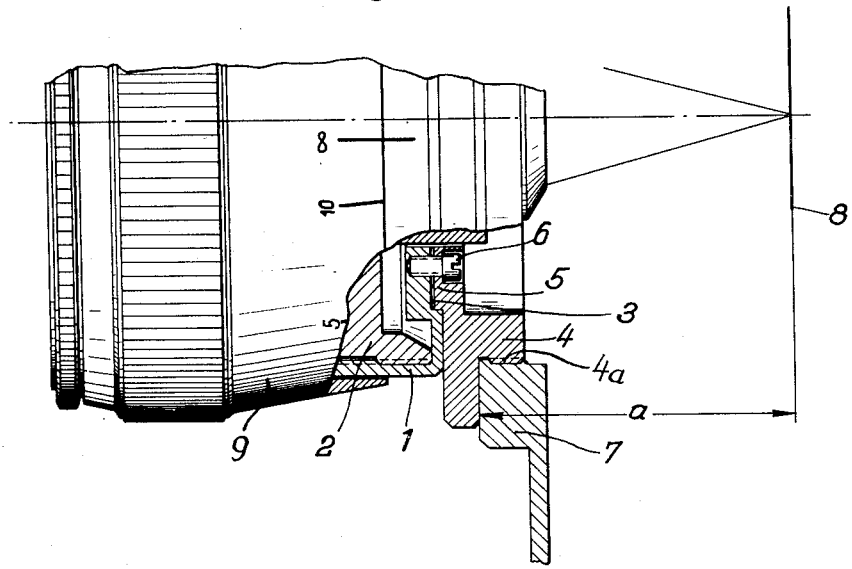

May 7, 1957

J. SCHMIDT 2,791,154

CONNECTING PIECE FOR PHOTOGRAPHIC
OBJECTIVES AND CAMERA BODIES
Filed Nov. 18, 1954

Inventor:
Johann Schmidt

United States Patent Office 2,791,154
Patented May 7, 1957

2,791,154

CONNECTING PIECE FOR PHOTOGRAPHIC OBJECTIVES AND CAMERA BODIES

Johann Schmidt, Gilching, near Munich, Germany, assignor to Kamerabau-Anstalt, Vaduz, Principality of Liechtenstein Application November 18, 1954, Serial No. 469,748

Claims priority, application Germany December 3, 1953

6 Claims. (Cl. 88—57)

This invention relates to a connecting piece for photographic objectives which is used as connecting member between the objective and the camera housing.

Photographic objectives which are intended to be used with various camera models having different bearing dimensions and different design of the connecting elements have to be adapted already by the manufacturer to the proper dimensions and must be provided with the appropriate type of connecting piece (threaded, bayonet type, plug-in type thread etc.). As up to now the connecting elements were always rigidly connected with certain mounting parts such as, for instance, the female part of the worm gear, or formed as a unit with such parts, it was necessary to remove these mounting parts and to replace them by appropriate new ones when the objective was intended to be used with another camera, repeated adjustment work and thus considerable loss of time resulting therefrom.

It is therefore the object of the present invention to provide for an appropriate design of the connecting piece for photographic objectives. By this design proposed according to the present invention the above disadvantage is eliminated, the objective mount is simplified and remodeling the objective for the use with another camera can be effected without the testing apparatus necessary for the adjusting of the objective.

According to the invention this object is accomplished by means of a rigid mounting part, preferably the outer part of the worm gear thread, which is provided with a centering recess into which fits a lug of the connecting piece. Naturally also the kinematic reversal can be used for this purpose, so that the mounting part is provided with a lug and the connecting piece has the recess which receives the lug. Fastening to the mounting part is reasonably effected with the aid of screw bolts. Different bearing dimensions are compensated by the various designs of the connecting pieces.

Embodiments of the invention illustrating the new manner of fastening the connecting piece to photographic objectives are represented in the drawings by way of example.

Figure 2:
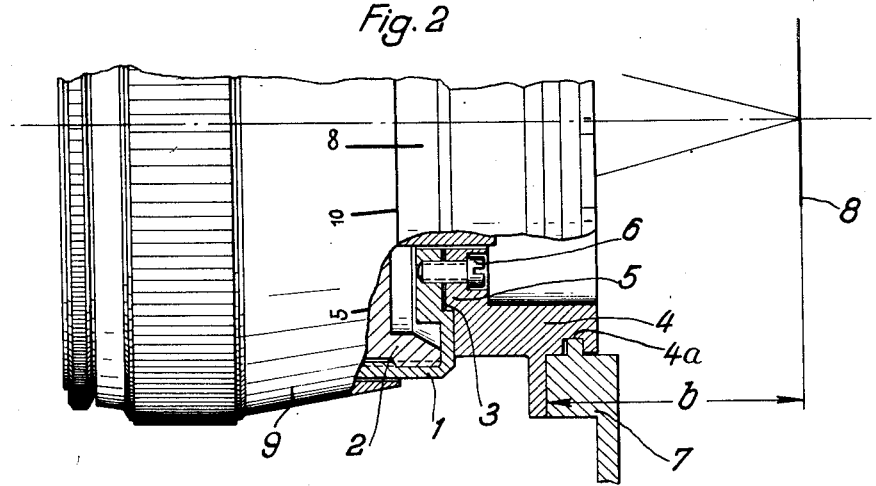

In the drawings:

Fig. 1 shows a connecting piece designed according to the invention which suits a case where the connection to the camera is effected through a thread, while Fig. 2 represents the design of a connecting piece suitable in the case where the connection to the camera is effected through a bayonet type connection.

In the embodiments selected for illustration the numeral 1 designates the outer part of the worm gear in which the inner part of the worm gear 2 and the optical system (not represented in the drawing) which is firmly connected with the inner worm gear part 2 are so arranged that they can be displaced. The fixed mounting part 1 has a central recess 3 by means of which the lug 5 of the connecting piece or coupling element 4 is centered, the latter being formed with a coupling portion or component 4a. A releasable connection is provided by screw bolts 6 distributed over the circumference. The connecting pieces or coupling elements 4 represented in the Figs. 1 and 2 are so designed that they simultaneously compensate for the different distances a, b, etc. of the coupling component 7 of the camera from the image plane 8, i. e. they compensate for the so-called bearing dimensions. This is accomplished by not only so shaping the coupling component 4a that it mates with the coupling component 7 of the camera, but also by properly selecting the axial length of the coupling element 4. In this way, the objective 9 will, irrespective of the construction of the camera with which it is associated, be spaced the proper distance from the image plane 8 of the camera.

I claim:

1. Device for the connection of the same interchangeable objective with various cameras, said device consisting of an intermediate connecting piece to be disposed between the objective and the camera, means for the centering of the objective at said intermediate connecting piece, said means consisting of a disk shaped projection at the intermediate connecting piece, said objective comprised in addition to the optical system of a mount enclosing said optical system, a recess in said mount adapted to receive the disk shaped projection of the intermediate connecting piece, projection and recess adapted to center the intermediate connecting piece and the objective relatively to each other, means for the establishment of a rigid connection between the objective and the intermediate connecting piece, said intermediate connecting piece adapted to the design of the camera which is provided for fastening the objective belonging to the camera, said adaptation suitable to arrange the intermediate connecting piece instead of the objective belonging to the camera.

2. Device for the connection of the same interchangeable objective with various cameras, as defined in claim 1, the dimensions of the intermediate connecting piece being so determined that the objective to be arranged by means of the intermediate connecting piece has independently of the design of the camera a constant distance from the image plane thereof.

3. A coupling arrangement for coupling the same objective to one of a plurality of cameras each of which has a differently constructed coupling component, comprising, in combination, an objective; a coupling element; connecting means for connecting said objective to said coupling element; and coupling means for coupling said coupling element to that one of the plurality of cameras to which said objective is to be coupled, said coupling means including a coupling component on said coupling element and capable of mating with the coupling componet of said one camera, whereby said objective may, when connected to said coupling element, be coupled to that one of the plurality of cameras which has a coupling component capable of mating with said coupling component on said coupling element.

4. A coupling arrangement for coupling the same objective to one of a plurality of cameras each of which has a differently constructed coupling component, comprising, in combination, an objective; a coupling element; connecting means for connecting said objective to said coupling element, said connecting means including a pair of mating connecting components one of which is on said objective and the other of which is on said coupling element; and coupling means for coupling said coupling element to that one of the plurality of cameras to which said objective is to be coupled, said coupling means including a coupling component on said coupling element and capable of mating with the coupling component of said one camera, whereby said objective may, when connected to said coupling element, be coupled to that one of the plurality of cameras which has a coupling component capable of mating with said coupling component on said coupling element.

5. A coupling arrangement as defined in claim 3 wherein said coupling element is so constructed and arranged that when said objective is connected to said coupling element and the same is coupled to said one camera, said objective is spaced a predetermined distance from the image plane of said one camera, and wherein another coupling element having a different coupling portion and therefore being adapted to couple said objective to another camera having a coupling portion capable of mating with said coupling portion of said other coupling element, is so constructed and arranged that when said objective is connected to said other coupling element and the same is coupled to said other camera, said objective is spaced said predetermined distance from the image plane of said other camera also.

6. A coupling arrangement for coupling the same objective to one of a plurality of cameras each of which has a coupling component at which an objective may be coupled to the camera but in which cameras the distances between a so-mounted objective and the image plane of the camera are different, comprising, in combination, an objective; and a plurality of coupling means each being adapted to be interposed between said objective and the coupling component of one of said plurality of cameras for coupling said objective thereto at its coupling component, each of said coupling means being so constructed and arranged that when said objective is coupled to the corresponding camera at its coupling component, the distance between said objective and the image plane of said corresponding camera is equal to a predetermined distance.

References Cited in the file of this patent

UNITED STATES PATENTS

| | | |
|---|---|---|
| 1,935,430 | Barmack | Nov. 14, 1933 |
| 2,032,866 | Black | Mar. 3, 1936 |
| 2,136,149 | Nuchterlein | Nov. 8, 1938 |
| 2,260,991 | Gorey | Oct. 28, 1941 |
| 2,287,468 | Cisski | June 23, 1942 |
| 2,461,357 | Broido et al. | Feb. 8, 1949 |
| 2,574,072 | Updegraff | Nov. 6, 1951 |
| 2,582,815 | Bolsey | Jan. 15, 1952 |
| 2,618,201 | Brohl et al. | Nov. 18, 1952 |

FOREIGN PATENTS

| | | |
|---|---|---|
| 838,686 | Germany | May 12, 1952 |